US008359683B2

(12) United States Patent
Patterson et al.

(10) Patent No.: US 8,359,683 B2
(45) Date of Patent: Jan. 29, 2013

(54) PATIENT LIFT AND TRANSFER DEVICE

(75) Inventors: Richard A. Patterson, Georgetown, TX (US); Ralph M. Smucker, Austin, TX (US)

(73) Assignee: ConMediSys, Inc., Austin, TX (US)

( * ) Notice: Subject to any disclaimer, the term of this patent is extended or adjusted under 35 U.S.C. 154(b) by 174 days.

(21) Appl. No.: 12/947,709

(22) Filed: Nov. 16, 2010

(65) Prior Publication Data

US 2011/0056018 A1 Mar. 10, 2011

Related U.S. Application Data

(60) Division of application No. 12/393,858, filed on Feb. 26, 2009, now Pat. No. 7,856,682, which is a continuation of application No. 11/534,535, filed on Sep. 22, 2006, now Pat. No. 7,540,044, which is a continuation-in-part of application No. 11/246,426, filed on Oct. 7, 2005, now Pat. No. 7,603,729.

(51) Int. Cl.
*B62D 5/06* (2006.01)

(52) U.S. Cl. ........................ 5/81.1 R; 5/86.1; 5/81.1 HS

(58) Field of Classification Search ................. 5/81.1 R, 5/86.1, 81.1 HS; 280/771, 91.1
See application file for complete search history.

(56) References Cited

U.S. PATENT DOCUMENTS 3,077,354 A * 2/1963 Rateau ............................ 280/99
3,304,116 A * 2/1967 Stryker ........................... 296/20
3,669,466 A * 6/1972 Spence ......................... 180/409
3,820,111 A * 6/1974 Candy ........................... 341/156
4,008,783 A * 2/1977 Herrmann et al. ............ 180/411
4,248,444 A 2/1981 Johnson
4,631,761 A 12/1986 Lederman
4,922,574 A 5/1990 Heiligenthal et al.
4,934,726 A * 6/1990 Daenens et al. .............. 280/408
5,033,763 A * 7/1991 Daenens et al. .............. 280/426
5,090,512 A * 2/1992 Mullet et al. .................. 180/236
5,937,456 A * 8/1999 Norris .............................. 5/88.1
6,286,165 B1 * 9/2001 Heimbrock et al. .............. 5/600
6,314,597 B2 11/2001 Heimbrock et al.
6,354,394 B1 * 3/2002 Bauer-Nilsen ................ 180/409
6,401,278 B1 * 6/2002 Hayes et al. ...................... 5/600
6,438,776 B2 8/2002 Ferrand et al.
6,598,247 B1 7/2003 Heimbrock et al.
6,735,794 B1 5/2004 Way et al.
6,792,630 B1 9/2004 Palmatier et al.
7,000,268 B2 2/2006 Johnson
7,487,559 B1 2/2009 Denosky
7,954,828 B2 * 6/2011 Falk et al. ................ 280/33.994

* cited by examiner

*Primary Examiner* — William Kelleher
(74) *Attorney, Agent, or Firm* — Jack V. Musgrove

(57) ABSTRACT

A patient transfer device has four casters and two counter-rotating steering wheels. The steering wheels provide a turning path whose center of curvature lies along a transverse centerline of the device. A foot pedal selectively lifts the steering wheels off the floor or brakes them. Another foot pedal at a back end of the device can lock the casters at the front end in a straight direction. The transfer table of the device may be inclined either longitudinally or transversely, and has an upper table whose edge rollers retract to introduce slack in the upper belt so that an air mattress can be inflated. The upper belt selectively disengages from the lower belt using movable, pneumatically-actuated pinch rollers. The outer surface of the upper belt is rough while the outer surface of the lower belt is smooth. The belts are constructed of a material which includes an antimicrobial agent.

4 Claims, 14 Drawing Sheets

PATIENT LIFT AND TRANSFER DEVICE

CROSS-REFERENCE TO RELATED APPLICATION

This application is a divisional of U.S. patent application Ser. No. 12/393,858 filed Feb. 26, 2009, now U.S. Pat. No. 7,856,682 which is a continuation of U.S. patent application Ser. No. 11/534,535 filed Sep. 22, 2006, now U.S. Pat. No. 7,540,044, which is a continuation-in-part of U.S. patent application Ser. No. 11/246,426 filed Oct. 7, 2005, now U.S. Pat. No. 7,603,729, each of which is hereby incorporated.

BACKGROUND OF THE INVENTION

1. Field of the Invention

The present invention generally relates to devices for moving objects, and more specifically to a method and device for transferring mobility-impaired persons, such as moving a patient from a bed to a table.

2. Description of the Related Art

A wide variety of products have been designed to move objects from one location to another and, in particular, transfer mobility-impaired individuals such as patients. In a hospital setting, patients must often be transported from their beds to an examination table or operating table, and back again. Basic devices for transferring patients include stretchers that are carried manually by two attendants, and wheeled gurneys that can more easily be handled by a single attendant.

There can still be problems, however, in getting a patient from a bed or other support surface onto a stretcher or gurney. If the patient is cooperative and not injured or disabled, it is a simple matter for the individual to slide over to the gurney with the assistance of a nurse, but if the patient is unconscious or has a disability or an injury (e.g., a broken bone) that might be worsened by movement, then great care must be taken in transferring the patient from the bed to the gurney. This problem is exacerbated when the patient is unusually heavy.

One solution to this problem is to slide a tray or sheet under the person and then, after the person is resting atop it, pull the tray or sheet off the bed and onto the gurney. A rigid tray can be forcibly inserted between the patient and the bed, and a sheet can be incrementally pushed under the person by first rocking him away from the gurney and then rocking back toward the gurney as the sheet is drawn under. This approach can still be difficult if the patient is uncooperative, and can further be very uncomfortable even if the patient is cooperative, due to the frictional engagement of the tray with the body or the lack of firm support by the sheet.

Some transfer devices incorporate a rigid tray into the gurney that can move to the side and slide under a patient, and then slide back (while supporting the patient) to a centered position for transportation. In a further variation on this concept, the transfer device may use counter-rotating, endless belts to substantially eliminate friction against both the patient and the bed as support trays crawl under the patient. One example of such a design is shown in U.S. Pat. No. 5,540,321. A first endless belt surrounds a set of upper trays and a second endless belt surrounds a set of lower trays, so the portions of the belts that are in contact (between the upper and lower tray sets) move in the same direction at the same rate as they counter-rotate. As the trays are inserted under the patient, the belt on the upper tray everts outwardly at the same rate as the translational movement of the trays to crawl under the patient without introducing any significant friction, and the belt on the lower tray similarly everts along the bed sheet. Once the patient is supported by the trays, the entire tray assembly is raised off the bed and the device can be rolled on casters to transport the patient.

There are still several serious problems with the counter-rotating belt designs. The entire transfer device (including the base and support members) moves as the trays are inserted under the patient, and the base must extend under the bed or table in order to prevent the device from tipping over when the patient is carried (see, e.g., FIG. 10 of '321 patent). Because of this limitation, such devices cannot be used in all settings, i.e., wherein there is insufficient clearance space under the bed or table (a situation becoming more common as more accouterments are added to beds and tables that occupy the space underneath). These devices further only allow loading and unloading along one side of the device, which can present problems when the patient is not suitably oriented (head-to-feet) on the device with respect to the bed or table. Designs such as that shown in the '321 patent are also not particularly comfortable as there is only a thin layer of the belt interposed between the patient and the hard surface of the metal support trays. Moreover, hospitals are becoming increasingly concerned with potential contamination from patient fluids, and the prior art belt-type transfer devices are difficult if not impossible to properly clean.

In light of the foregoing, it would be desirable to devise an improved patient transfer device that provided more flexibility in deployment while still being easy to operate and maneuver. It would be further advantageous if the device were more comfortable for the patient.

SUMMARY OF THE INVENTION

It is therefore one object of the present invention to provide an improved method and device for transporting an object such as a patient from one location to another.

It is another object of the present invention to provide such a patient transfer device that does not require clearance space under the patient's bed or table during operation.

It is yet another object of the present invention to provide an improved patient transfer device that allows convenient loading or unloading on either side of the device.

The foregoing objects are achieved in a transfer device generally comprising a base having at least one support member, a carriage member attached to the support member movable between a home position over the base and an extended position to a side of the base, and a table assembly having a lower table member fixed to the carriage member and an upper table member coupled to the lower table member movable between a downward position wherein said upper table member is in forcible contact with said lower table member and an upward position wherein said upper table member has no contact with said lower table member. The device is operated by positioning the base adjacent the object support surface (e.g., a bed or table), adjusting a height of the table assembly to a height of the support surface, moving the table assembly toward the extended position with the upper and lower tables in forcible contact to place the table assembly underneath the object but resting upon the support surface while keeping the base stationary, separating the upper and lower tables with the table assembly in the extended position to lift the object above the support surface on the upper table while the lower table remains resting upon the support surface, and moving the table assembly back toward the home position while supporting the object on the upper table and keeping the upper and lower tables separated. The device may operate in a bidirectional manner wherein the extended position is a first extended position to a first side of the base, and the table assembly is further movable toward a second extended position to a second side of the base opposite the first side while supporting the object on the upper table and keeping the upper and lower tables separated. In the exemplary embodiment, the upper table includes an upper plate surrounded by a first belt, the lower table includes a lower plate surrounded by a second belt, and the first and second belts counter-rotate against each other as the table assembly is moved toward the extended position with the upper and lower tables in forcible contact. The table assembly is advantageously synchronized to move to or from the home position at a speed that matches an eversion rate of the counter-rotating belts. The upper and lower plates are preferably separable by a distance of at least 1 to 2 inches in order to facilitate cleaning of the belt surfaces. A pad may be inserted between the upper plate and the top belt to provide more comfort to the patient during transfer and reduce pressure sores. A low-friction layer is preferably interposed between the pad and the top belt.

In an alternative embodiment, the patient lift and transfer device has a steering system which includes four swivel casters and two centerline steering wheels coupled to counter-rotate. The steering wheels provide a turning path whose center of curvature lies along a transverse centerline of the device, and may be controlled by handlebars mounted at each end of the device. A foot pedal is provided to selectively lift the steering wheels off the floor or brake them. Another foot pedal is provided at a back end of the device to lock the pair of casters at the front end in a straight direction. The transfer table of the device may advantageously be inclined either longitudinally (for patient comfort during transfer) or transversely (for moving under the patient during acquisition). The transfer table preferably has an upper table portion whose edge rollers can retract to introduce sufficient slack in the upper belt so as to have room to inflate an air mattress lying just under the upper belt. The edge rollers are rotatably supported by retraction arms having a slot which guides a cam follower affixed to the upper table. The upper belt is selectively disengaged from the lower belt using a set of movable pinch rollers in the upper table. The movable pinch rollers can be pneumatically actuated. In this embodiment, the outer surface of the upper belt has a higher coefficient of friction while the outer surface of the lower belt has a lower coefficient of friction. The belts are preferably constructed of a material which includes an antimicrobial agent such as a bacteriacide.

The above as well as additional objectives, features, and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
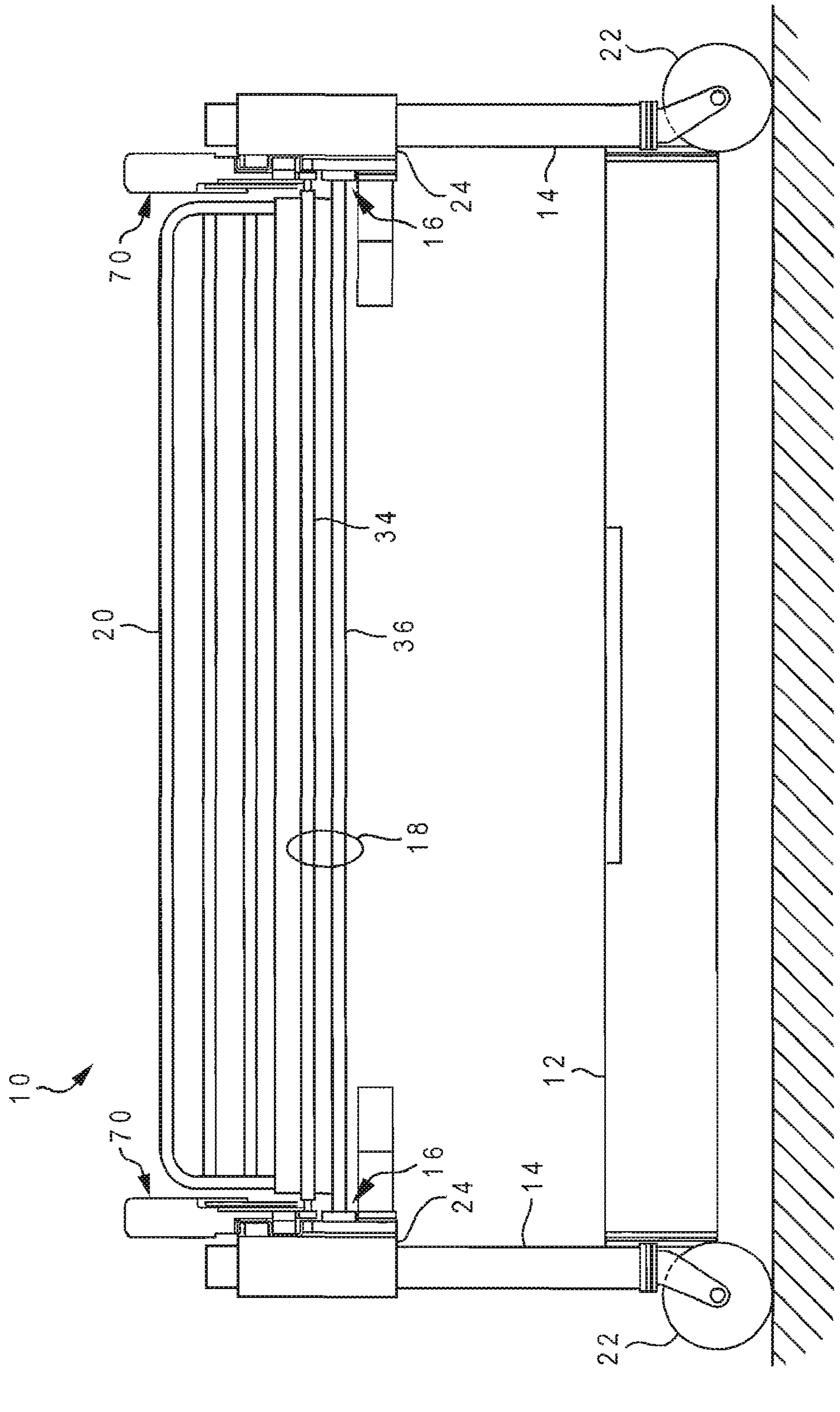
FIG. 1 is a side elevational view of one embodiment of a patient lift and transfer device constructed in accordance with the present invention.
Figure 2:
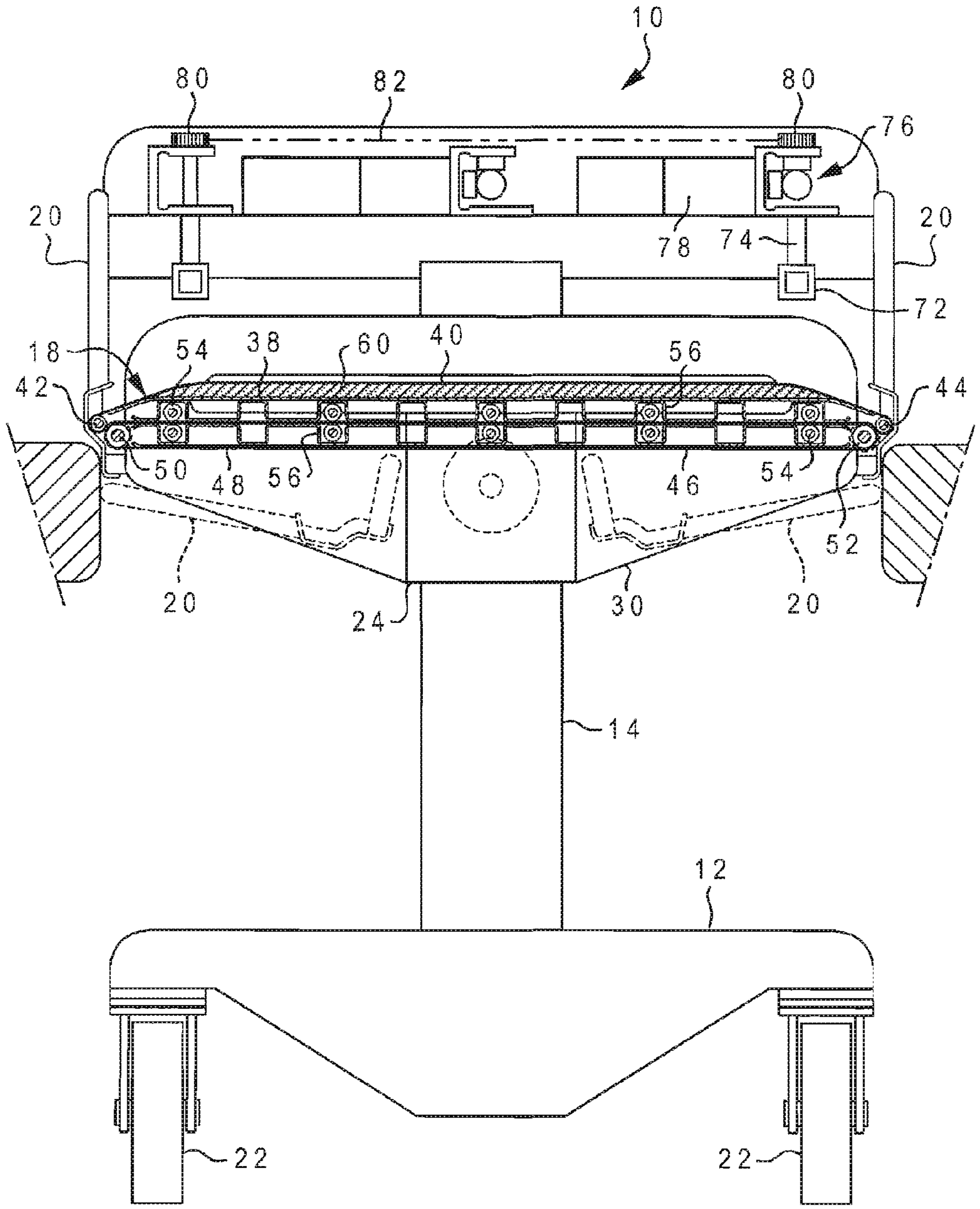
FIG. 2 is a front elevational view of the patient lift and transfer device of FIG. 1.
Figure 3:
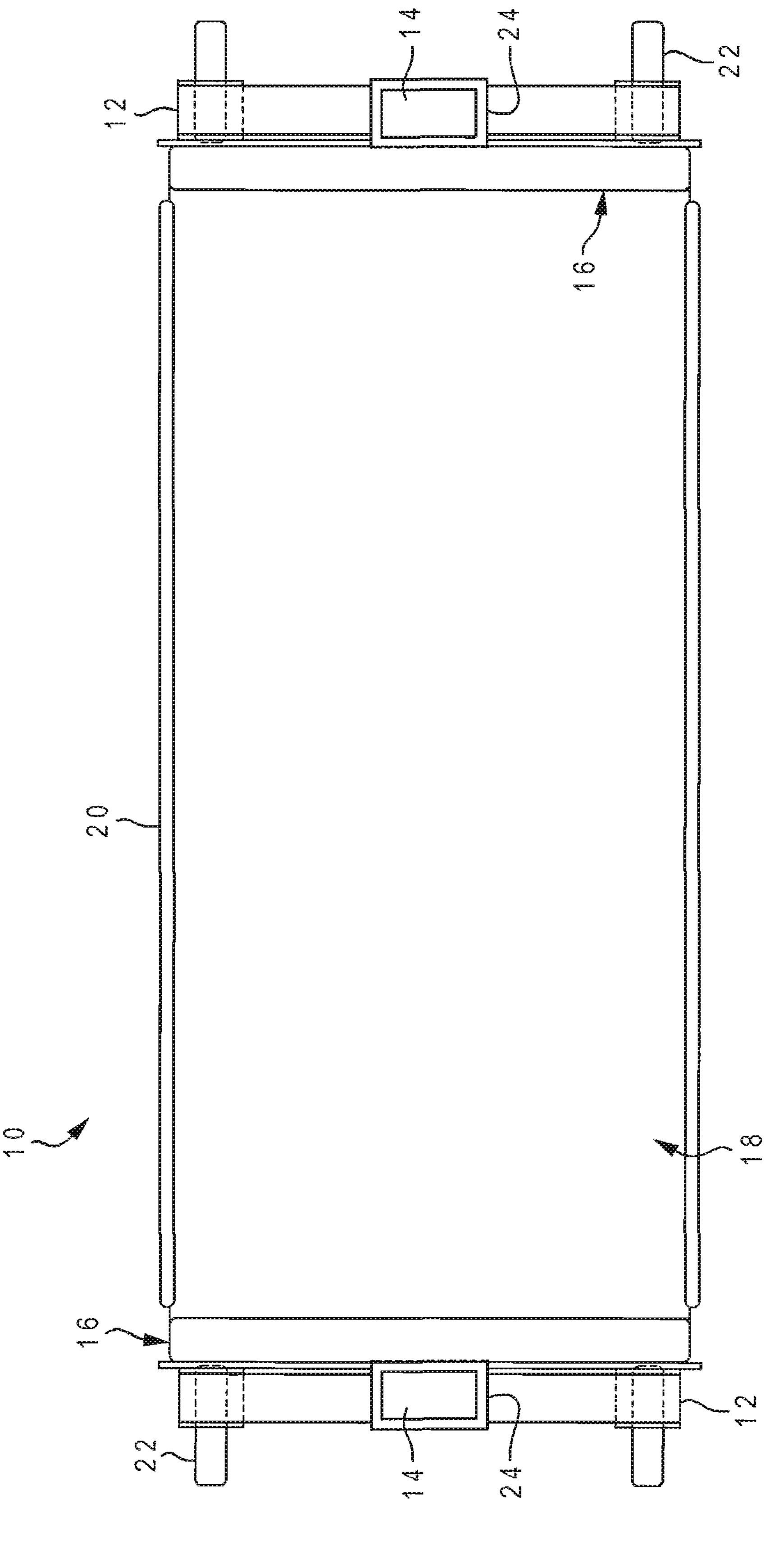
FIG. 3 is a top plan view of the patient lift and transfer device of FIG. 1.

With reference now to the figures, and in particular with reference to FIGS. 1-3, there is depicted one embodiment 10 of a patient lift and transfer device constructed in accordance with the present invention. Patient lift and transfer device 10 is generally comprised of a frame or base 12, two vertical support columns 14 mounted on base 12, a horizontal slide assembly 16 attached to support columns 14, a table assembly 18 attached to slide assembly 16, and side rails 20 attached to support columns 14.

Base 12 is generally rectangular in shape when viewed from above, and extends the full length of device 10. Base 12 is constructed of any durable material, preferably a fairly dense metal or metal alloy such as stainless steel to help anchor the device. Four wheels or pivoting casters 22 are attached to base 12, one at each corner, and provide a clearance space of about three inches between the bottom of base 12 and the floor. Casters 22 are preferably large-diameter, low-rolling resistance and have locking mechanisms or brakes to keep base 12 stationary during a loading or unloading operation. Alternately, it may be desirable to lower four locking posts (having rubber feet and located at each corner)

down onto the floor from base 12, slightly lifting the wheels off the floor; the posts then rigidly hold the unit in position during lifts and transfers. The rear wheels may be fixed with only front casters to facilitate pushing device 10 in a manner similar to a grocery cart. A suspension system can optionally be installed between the base and the wheels for smoother transportation of the patient.

Support columns 14 are tubular members rectangular in cross-section, and are preferably constructed of stainless steel. Support columns 14 may be mounted on base 12 by inserting the lower ends into mating sockets of base 12 and securing them using fasteners such as bolts or by welding. The effective height of support columns 14 is adjustable, by using vertically sliding or telescoping sleeves 24 that surround the upper portions of columns 14. Sleeves 24 may be coupled to columns 14 by lead screws or interlocking slide structures that may be actuated by a foot pedal to selectively raise and lower the sleeves. The power distribution system from the foot pedal may be mechanical, hydraulic, or a combination thereof. Alternatively, an electric motor can be used to power the movement of sleeves 24, and a rechargeable electric battery can be stored within a compartment of base 12, with a switch or dial to control the electric motor.

Side rails 20 are positioned in a vertical orientation along the left and right sides of patient lift and transfer device 10 after the patient has been loaded, to prevent the patient from rolling or sliding off during transportation. Side rails 20 can be stowed underneath table assembly 18 during a loading or unloading operation. The side rails are releasably locked into either of these two positions using underside tabs or clips that latch onto detents formed on the support columns.

Figure 4:
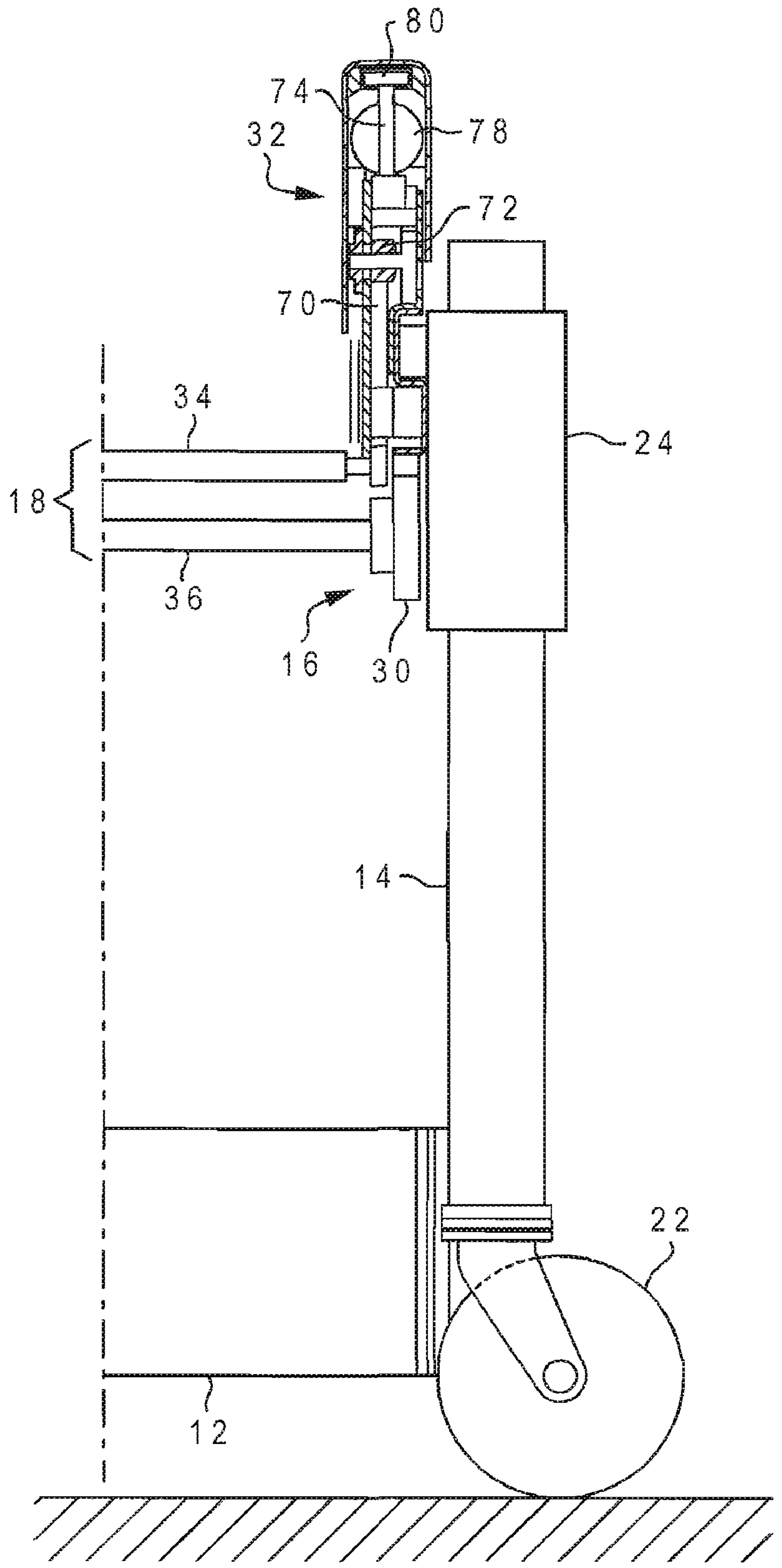
FIG. 4 is a side elevational view of one of the adjustable support members and a lift mechanism for the patient lift and transfer device of FIG. 1.

FIG. 4 illustrates in further detail how table assembly 18 is attached to slide assembly 16, and how slide assembly 16 is attached to support columns 14. Slide assembly 16 includes two slide frames 30 fixed at each end of device 10 (head and foot) to respective support column sleeves 24, and two carriages 32 that slide within bearing tracks of slide frame 30 similar to a sliding desk drawer. Slide frames 30 are preferably constructed of stainless steel and are affixed to sleeves 24 by fasteners or welding. Carriages 32 may also be constructed of stainless steel. Carriages 32 are members that are free to slide within frames 30 to either the left side or right side of the unit.

Figure 5:
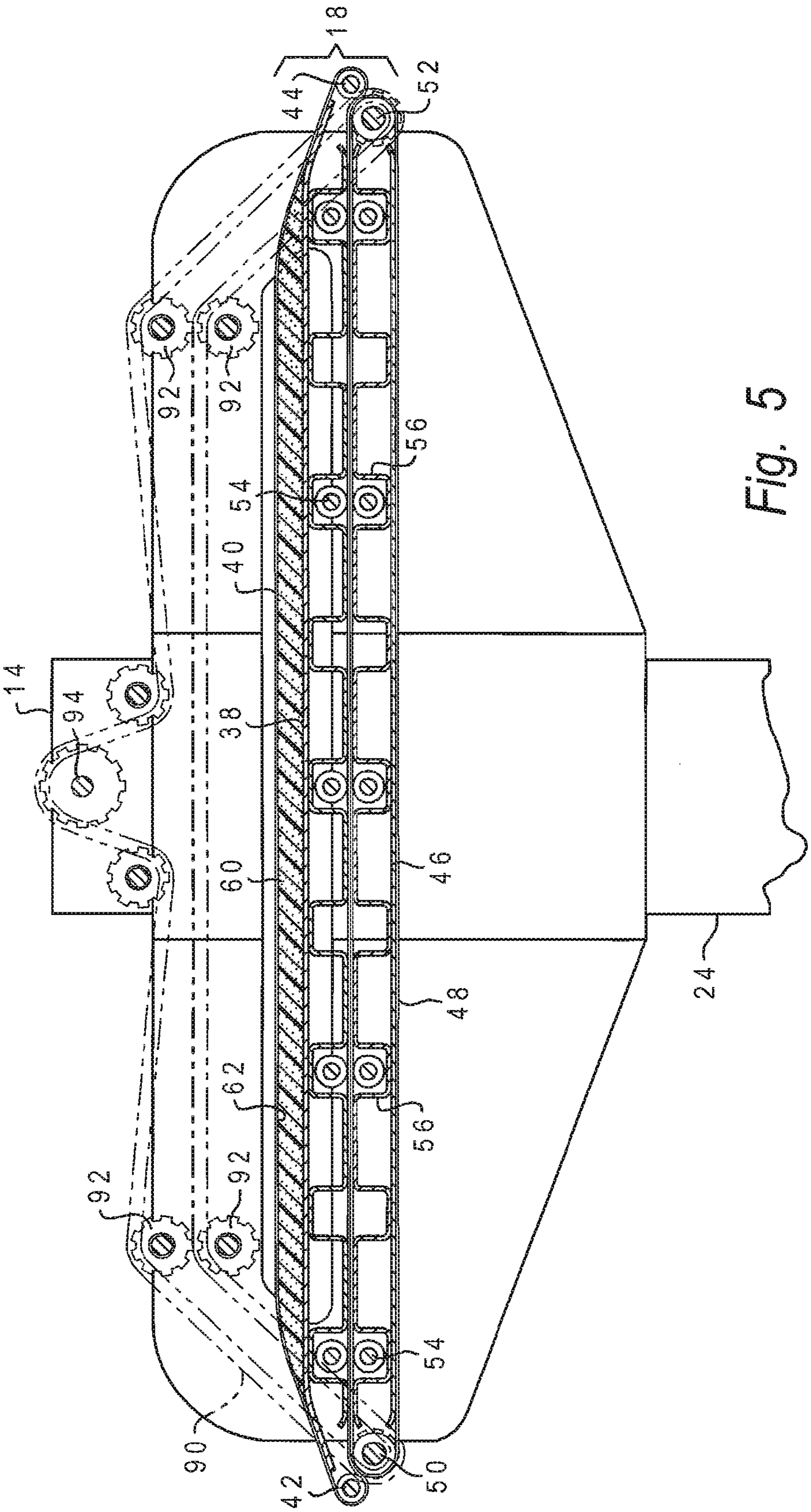
FIG. 5 is a front elevational view of the patient lift and transfer device of FIG. 1 depicting internal details of the upper and lower support plates and belt drive mechanism.

Table assembly 18 includes an upper table portion 34 and a lower table portion 36. As seen in FIGS. 2 and 5, upper table portion 34 includes an upper plate 38 surrounded by a first endless belt 40, and small diameter idler rollers 42, 44 inside the belt along both lengthwise edges of the plate. Lower table portion 36 includes a lower plate 46 surrounded by a second endless belt 48, and larger diameter drive rollers 50, 52 inside the belt along both lengthwise edges of the plate. The span between idler rollers 42, 44 is wider than the span between drive rollers 50, 52, i.e., each lengthwise edge of upper table portion 34 slightly overlaps the corresponding lengthwise edge of lower table portion 36 when the table assembly is in its centered (home) position. The belts do not need to completely surround the plates across their full length, but the width of the belts preferably extends substantially the full length of the table assembly members.

Upper and lower plates 38, 46 are preferably formed from corrugated sheets of rigid metal such as stainless steel, whereby alternating grooves and ridges form discontinuous upper and lower surfaces for each plate 38, 46. Opposing rollers or platens 54 are disposed within every other groove 56 of the corrugations, and serve to forcibly press the bottom leg of top belt 40 against the top leg of bottom belt 48 when upper table portion 34 is in contact with lower table portion 36. The platens also help distribute the load of the patient lying on the top surface to the lower support plate structure.

A foam pad 60 that is generally the same size as upper plate 38 is positioned between the underside of the top leg of top belt 40 and the upper surface of upper plate 38. The lengthwise edges of foam pad 60 are tapered to allow top belt 40 to more easily move from one set of edge rollers over the top surface of foam pad 60, and back to the opposite set of edge rollers. Foam pad 60 generally makes the unit more comfortable for the patient during transportation, and prevents pressure sores from being created when patients are resting on the device for extended periods. In the exemplary embodiment pad 60 polyurethane foam about 0.75 inches thick, and the lengthwise edges of the foam are tapered on one side only, from a thickness of about 0.12 inches at the edge to full thickness approximately 5 to 6 inches in from the edges. Instead of a foam pad, the pad could be an air mattress, water-filled bladder, etc.

To further facilitate the movement of top belt 40 along foam pad 60, a thin layer 62 of low-friction material can be used to cover foam pad 60, i.e., to contact the underside surface of the top leg of top belt 40. Low-friction layer 62 may be a fabric reinforced Teflon sheet that is anchored beyond the tapered edges of the foam pad at the edges of upper plate 38, and extends across the complete width and length of foam pad 60. The edges of the sheet can be secured by fasteners, adhesives, or crimping the edges of plate 38. This design of upper table portion 34 could serve as a separate (manual) transfer table.

Belts 40 and 48 may be formed as true endless belts or with a joining seam (overlapping without adding extra thickness), and are constructed of any durable, flexible material such as fabric-reinforced polyvinyl chloride (PVC) elastomer. Each belt preferably has a thickness in the range of 0.03 to 0.04 inches and is as wide as the overall length of patient lift and transfer device 10. Bottom belt 48 may have small cross-sectional V-shaped guiding/driving strips located every foot on the inside of belt 48, and top belt 40 may have smaller V-shaped strips every two feet. The outside surfaces of the belts provide a high coefficient of friction with the bed or patient (for example, using PVC or ethyl vinyl acetate (EVA)), and the inside surfaces of the belts has a coating made from a low-friction material such as Teflon.

Returning to FIG. 4, the axles of drive rollers 50, 52 and the platens 54 within lower table portion 36, and lower plate 46, are all attached at their lengthwise ends to carriages 32. Lower table portion 36 accordingly moves vertically with the movement of sleeves 24. The axles of idler rollers 42, 44 and the platens 54 within upper table portion 34, and upper plate 38, are all attached at their lengthwise ends to four vertical plate separators 70, one at each corner of device 10. Each vertical plate separator 70 is affixed to carriage 32, so the vertical plate separators also move vertically with the movement of sleeves 24. Vertical plate separators 70 include short screw jack assemblies each consisting of a nut 72 attached to one of the corners of upper plate 38, and a lead screw 74 that engages nut 72 and is attached to carriage 32. A right-angle gear box 76 transmits power to lead screw 74 through a horizontally-oriented gear motor 78. Motors 78 are used to directly drive one of the two lead screws at a given end of device 10, and the second lead screw at that end is driven from the first lead screw via a pair of sprockets 80 and a drive chain 82. The vertical plate separators act to separate upper table portion 34 from lower table portion 36 by at least 1 to 2 inches. When the table portions are separated, there is slack in top belt 40, but the separation distance is still sufficient to remove any contact between the sagging portion of the top belt and the top leg of bottom belt 48.

An exemplary drive mechanism for the belts is depicted in FIG. 5. One end of each axle of drive rollers 50 and 52 has teeth or a gear which engages a drive chain 90. Drive chain 90 is supported under tension by several idler sprockets 92 and a drive shaft 94. Idler sprockets 92 and drive shaft 94 are rotatably mounted on an extension of carriage 32, such that the drive mechanism moves vertically with the movement of sleeve 24 and further moves to one side of the unit as table assembly 18 is positioned on that side. Idler sprockets 92, drive shaft 94, and rollers 42, 44, 50, and 52 can rotate clockwise or counter-clockwise. When upper table portion 34 is in forcible contact with lower table portion, movement of bottom belt 48 via drive chain 90 in either direction will in turn drive top belt 40 through the frictional engagement of the belts' outside surfaces. When upper table portion 34 is in the raised position with respect to lower table portion 36, the belts will not be in contact so driving bottom belt 48 will not move top belt 40.

A rack and pinion mechanism may be used to drive the horizontal (sideways) movement of carriage 32 and table assembly 18 between the home and extended (left/right) positions. A rack is affixed to each carriage 32 with the length of the rack extending along the direction of the sliding movement of carriage 32. A drive pinion is mounted to each slide frame 30 and engages the teeth of the adjacent rack. The movement of slide assembly 16 is synchronized with the belt drive mechanism illustrated in FIG. 5, so that carriage 32 slides sideways to or from the home position at a speed that matches the eversion rate of belts 40 and 48. This synchronization may be accomplished using stepper motors whose movement is monitored and controlled by sensors in the motors, or by a mechanical coupling. In this manner, table assembly 18 can crawl under (or away from) the patient with essentially no frictional engagement between the patient and top belt 40 or between the bed/table and bottom belt 48, and further performs this operation without requiring that base 12 also move sideways.

Vertical plate separator 70, drive shaft 94 and drive pinions 102 may all be powered via the same foot pedal that is used to raise and lower sleeve 24, by providing mechanical means (gears, shafts, sprockets, levers, cams, latches, etc.) and/or hydraulic means (pumps, piston cylinders, motors, valves, rigid or flexible tubing, etc.) with manually operated switches that allow the operator to select the movement mode and apply the power system to the desired drive mechanisms. Alternatively, two or more foot pedals can be employed to power the following four motions: linear vertical motion to raise and lower the table assembly to the height of a bed from which a patient is to be transferred; rotary motion to extend and retract the belt table to the right side or left side during placement or removal of a patient from a bed; rotary motion to drive the bottom belt on the belt table clockwise or counter-clockwise; and linear or rotary motion to raise and lower the upper table portion with respect to the lower table portion. The foot pedals are preferably located in a recess of base 12 so as to prevent damage to the pedals if the unit slams against a wall or other object. Instead of foot pedals, power can be supplied by one or more electric motors with a portable power supply and controls.

The moving parts of device 10 can be limited by safety interlocks to prevent an operator from ever transferring a patient to a position on or adjacent the device that would endanger the patient's safety. Safety interlocks can be used to prevent: horizontal or vertical table motion unless the casters/wheels are locked against rotating or other means have been deployed to prevent movement of the base; horizontal (sideways) motion of the table assembly or slide assembly unless sensors indicate that there is sufficient pressure against the bed mattress or other support surface; rotation of the belts unless these sensors are active; movement of the casters/wheels (or retraction of locking posts) unless the table assembly (or sleeve 24) is below a prescribed height to reduce top heaviness while the device is functioning as a gurney.

Figure 6:
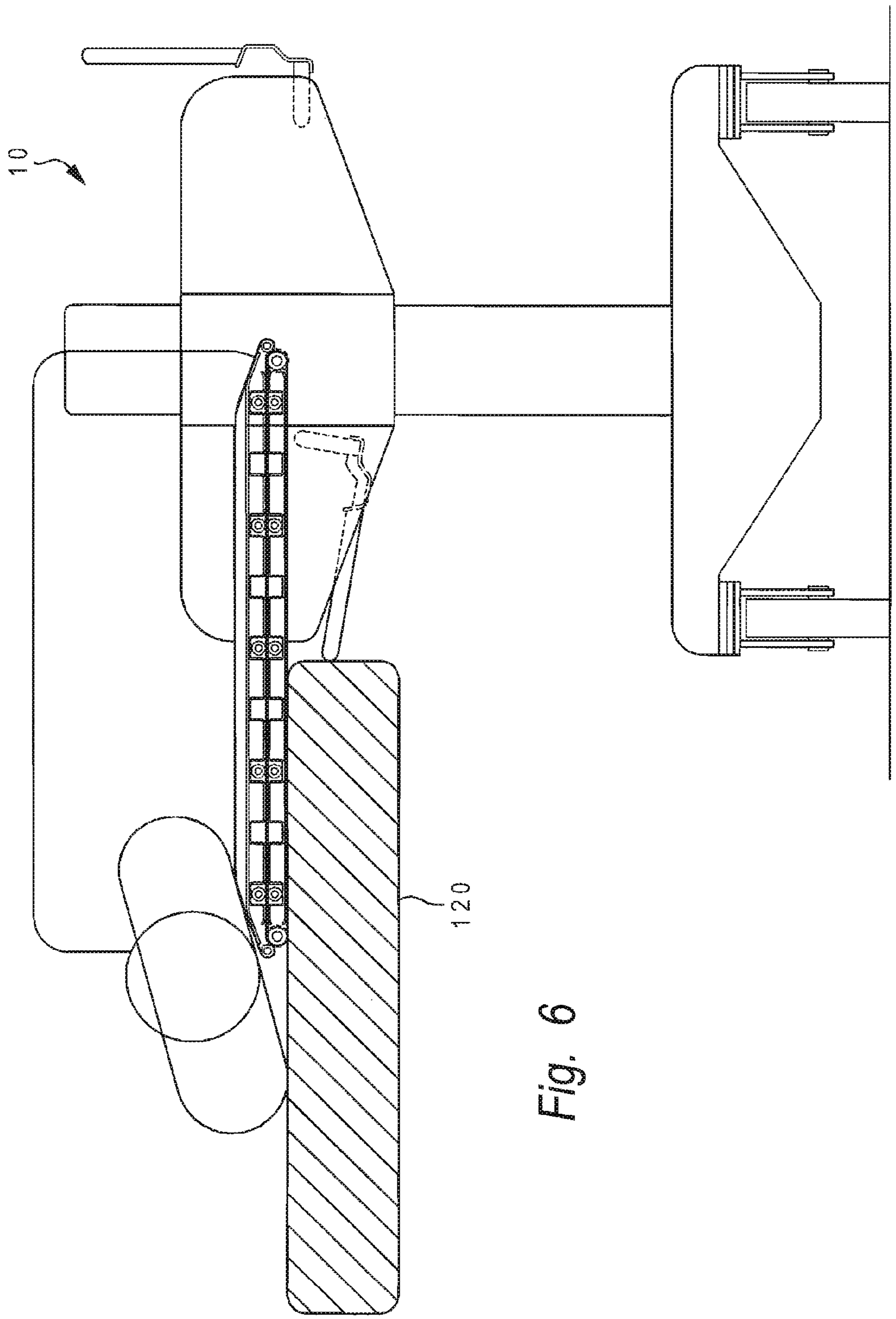
FIG. 6 is a front elevational view of the patient lift and transfer device of FIG. 1 illustrating initial placement of the support plates under a patient to be transferred.
Figure 7:
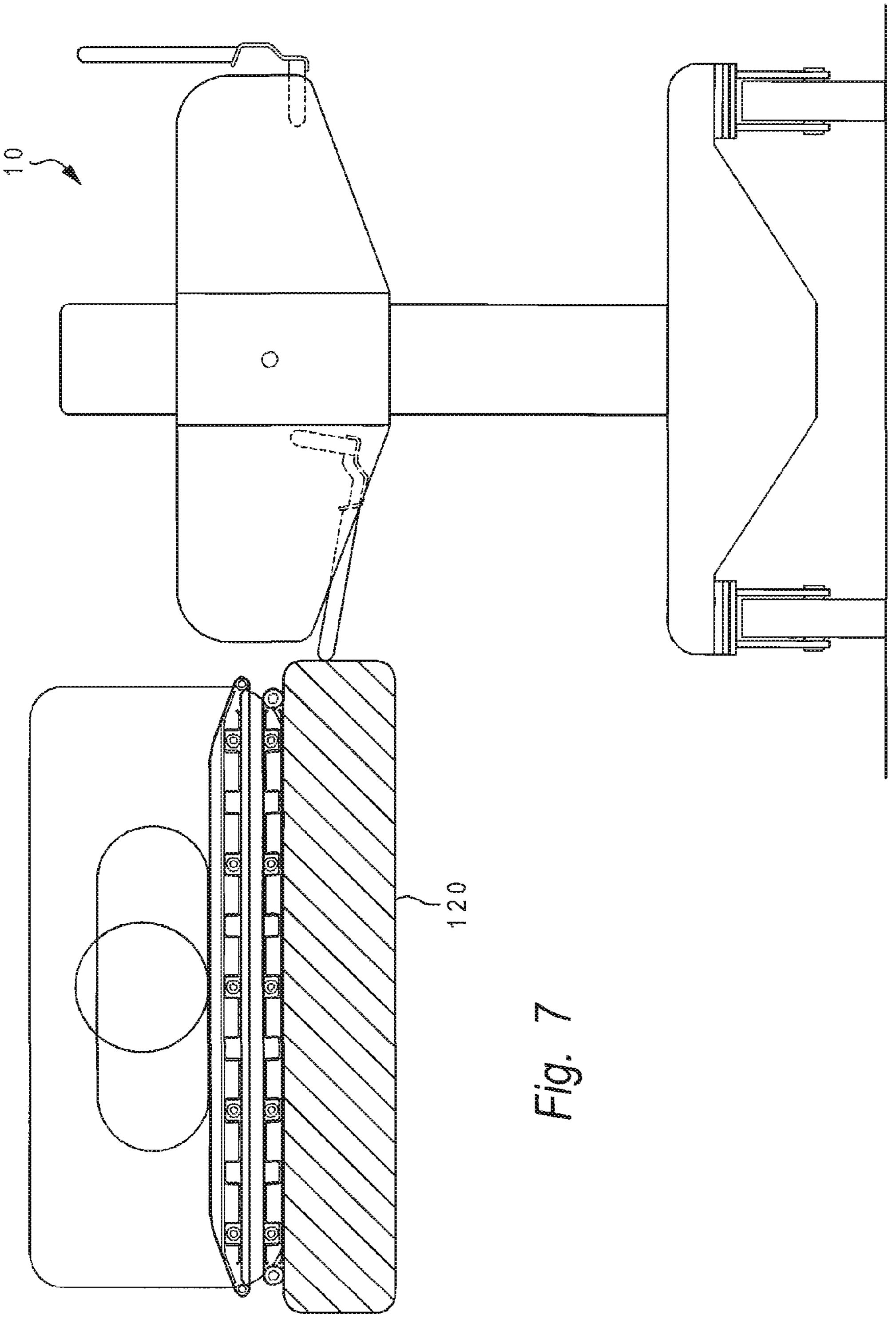
FIG. 7 is a front elevational view of the patient lift and transfer device of FIG. 1 illustrating lifting of the patient and separation of the upper and lower support plates.
Figure 8:
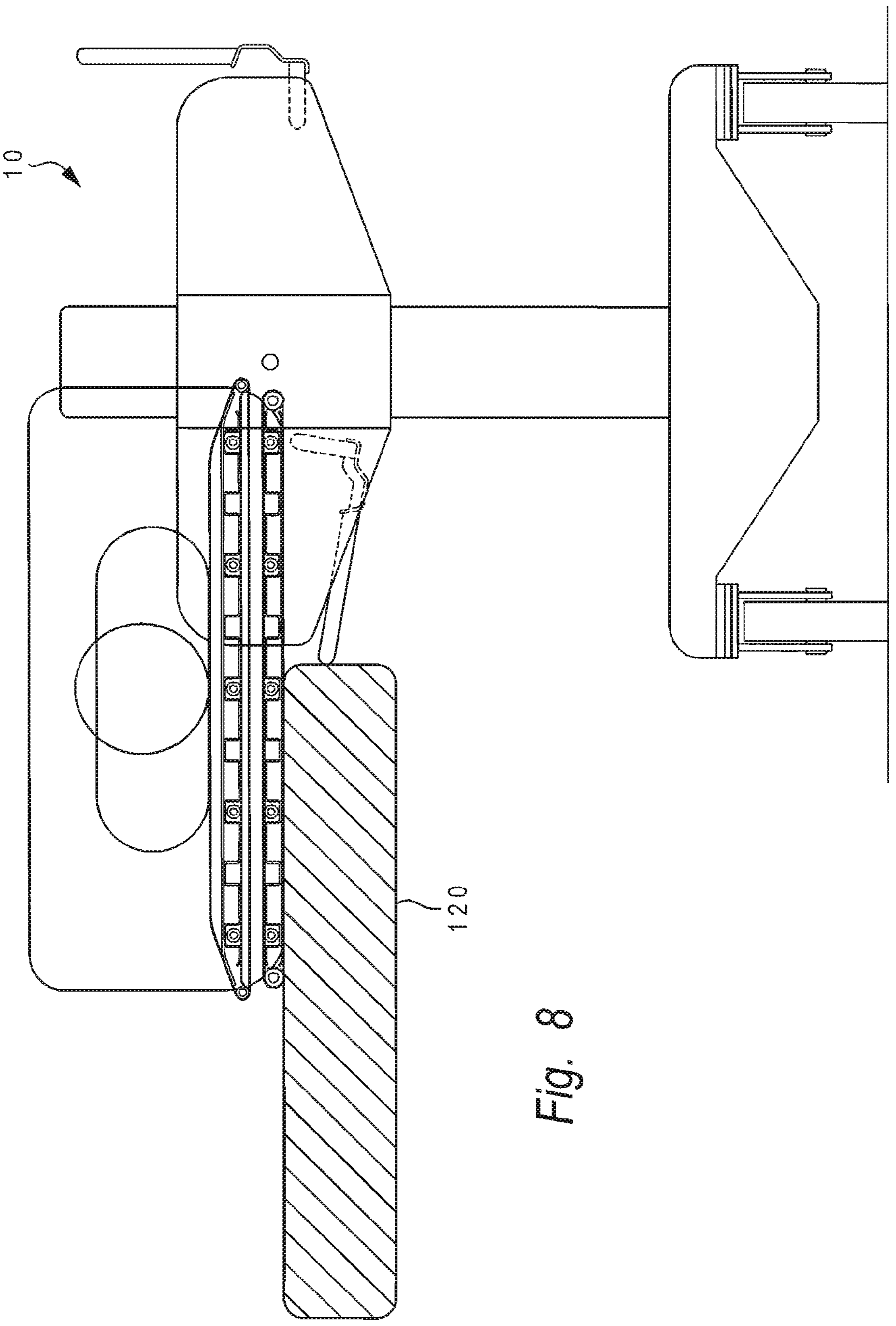
FIG. 8 is a front elevational view of the patient lift and transfer device of FIG. 1 illustrating a home position of the support plates for transporting the patient.
Figure 9:
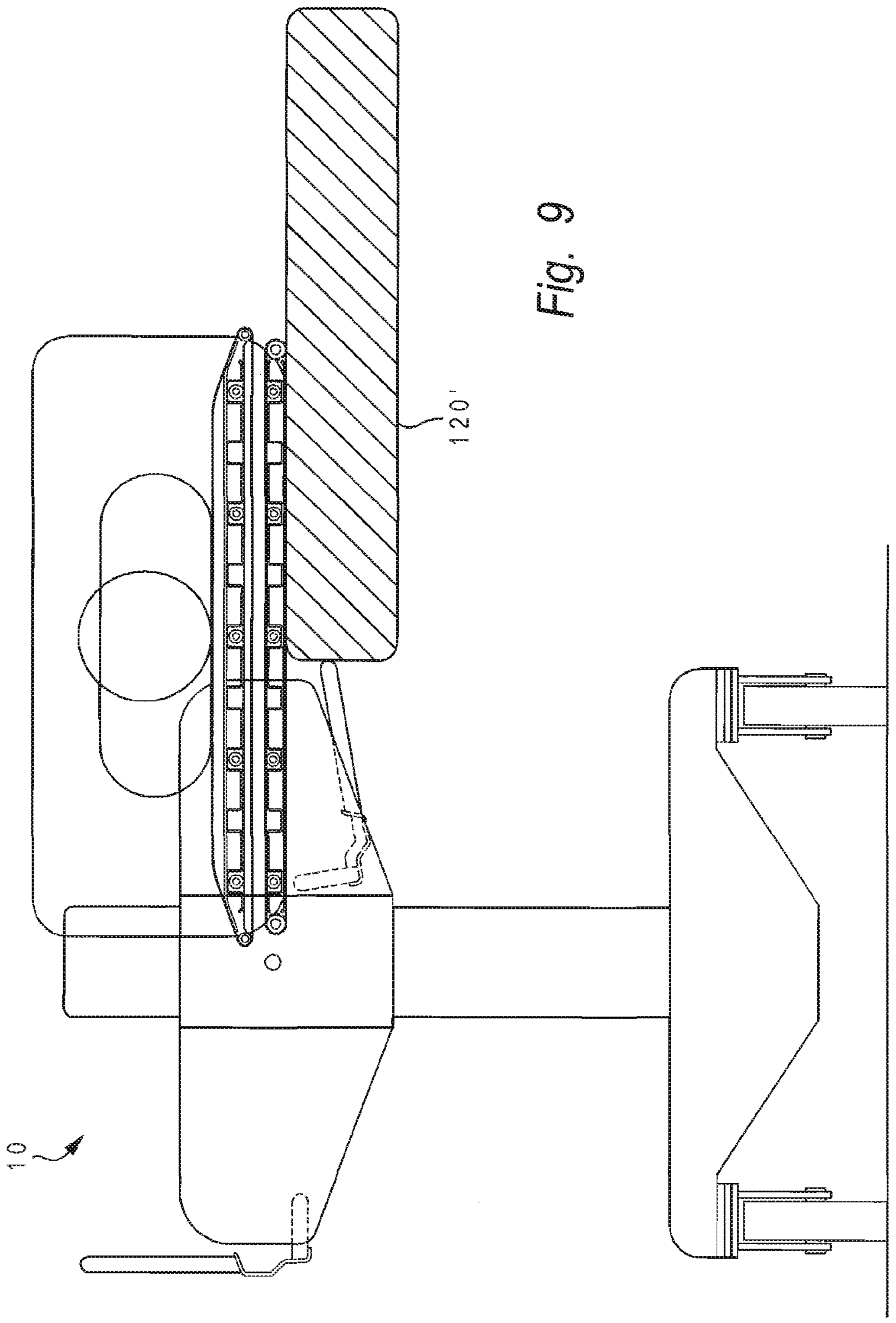
FIG. 9 is a front elevational view of the patient lift and transfer device of FIG. 1 illustrating the transfer of the patient to the opposite side of the device.

The present invention may be further understood with reference to FIGS. 6-9 which illustrate the loading and unloading of a patient using lift and transfer device 10. In FIG. 6, device 10 has been positioned adjacent a hospital bed or table 120, and slide assembly 16 is partially extended, with upper and lower table portions 34 and 36 in contact with one another, and the leading edge of table assembly 18 just starting to crawl under the patient. The device may be used whether the patient is supine or prone. In FIG. 7, table assembly 18 has been moved fully under the patient, and the upper and lower table portions have been separated. The moment force from the patient acting on the device is transferred from upper table portion 34 to lower table portion 36 by means of their coupling through vertical plate separator 70 and carriage 32, so that lower table portion 36 laterally supports the device. Slide assembly 16 and table assembly 18 can then be moved back toward the home position as shown in FIG. 8. Top belt 40 is stationary as the patient is transferred to or from the home position since the table portions are still separated, and the leading edge of lower table portion 36 continues to support the device as long as it rests on the mattress of bed 120. Once these assemblies have returned to the home position (substantially centered over base 12), the patient can be transported to another location using device 10 as a gurney. FIG. 9 depicts offloading of the patient on the opposite side of device 10 to another bed or table 120', i.e., patient lift and transfer device 10 is bidirectional. In this embodiment the construction and movement of slide assembly 16, table assembly 18, and their drive mechanisms are generally symmetric along a common lengthwise axis of the upper and lower table portions.

By utilizing a slide assembly that moves the support table under the patient without having to move the base of the unit, patient lift and transfer device 10 advantageously becomes usable in those situations where this is little or no clearance space under the bed or table. Many prior art devices require part of the base to extend under the bed/table in order to prevent the device from tipping over once the patient has been loaded onto a support surface. The present invention eliminates this concern by allowing the upper and lower table portions to separate, which enables the lower table portion to laterally support the device while the entire table assembly is returning to the home position. Furthermore, this design still takes advantage of counter-rotating belts to reduce frictional engagement while loading or unloading, but leaves the patient undisturbed on the upper table portion as the patient is transferred from the bed to the device.

The dimensions of patient lift and transfer device 10 may vary considerably depending upon the application. For example, a pediatric device will be considerably smaller than a device adapted for an average adult. The following approximate dimensions are deemed exemplary: base 12 is generally 88"×34"×9"; wheels 22 are 6" in diameter; support columns 14 are 2"×5" in cross-section and extend 44" above base 12; sleeves 24 are 9" tall; slide frames 30 are 33" long with a 4" high track; carriages 32 are 33"×10"×2.5"; upper and lower plates 38, 46 are 33"×79" and their corrugations form a thickness of 0.75".

The present invention enables caregivers to easily, safely and comfortably move prostrate patients between a wider variety of beds, tables and other support surfaces, and is very intuitive to use and may be operated by nursing staff having ordinary skills, without significant operator training The ability to load patients from either side of the device imparts additional flexibility in deployment. The clearance space provided by separation of the upper and lower table portions also significantly allows the proper cleaning and disinfecting of the belt surfaces in case of contamination by patient fluids. The device can further be easily adapted for particular uses, e.g., by mounting IV bag supports on the base or providing storage compartments in the base.

Figure 10:
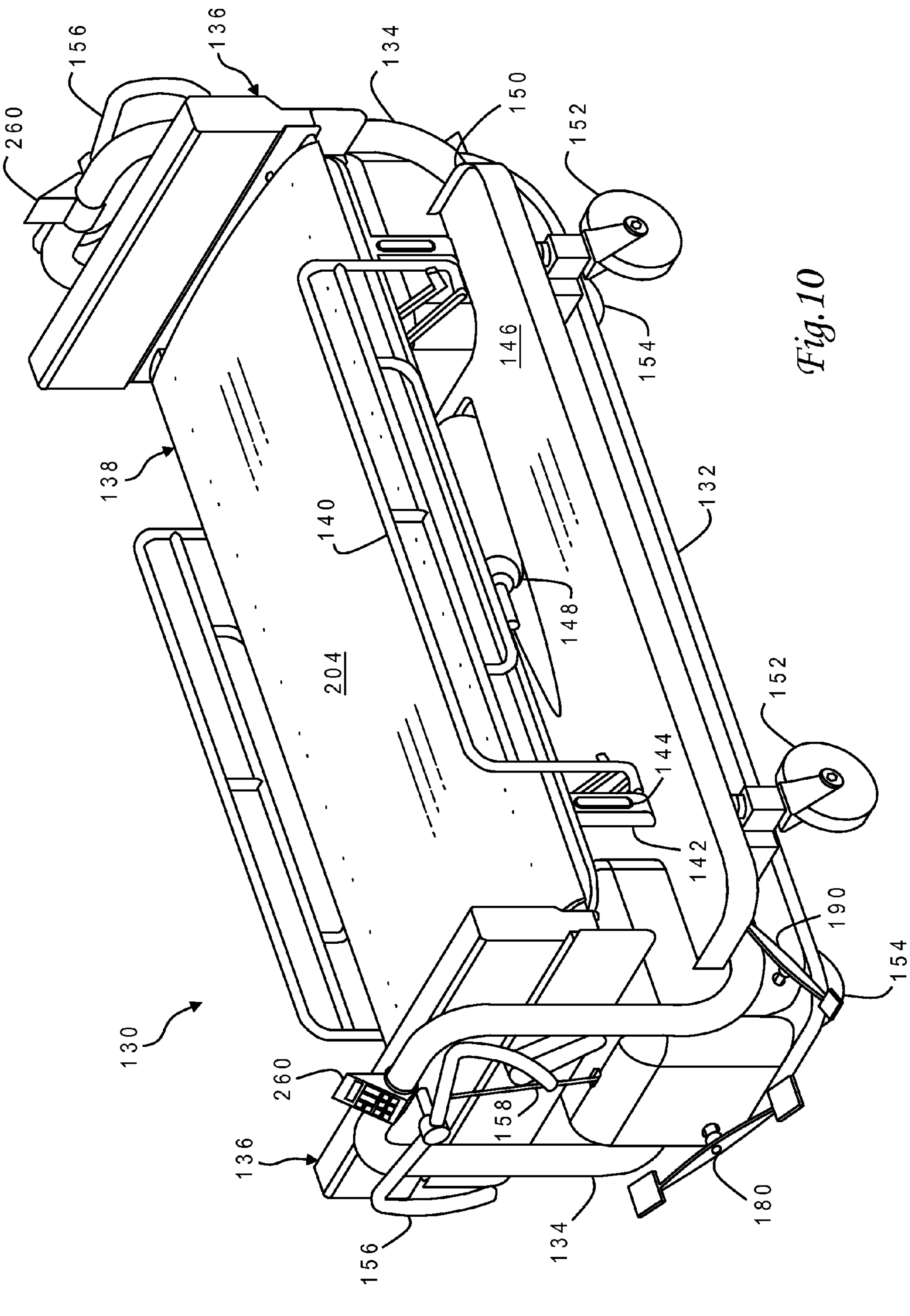
FIG. 10 is a perspective view of another embodiment of a patient lift and transfer device constructed in accordance with the present invention.

Another embodiment 130 of the patient lift and transfer device of the present invention is shown in FIG. 10 with certain refinements in the transfer table, steering mechanisms and conveyor belts. Patient lift and transfer device 130 is generally comprised of an elongate frame or base 132 having vertical support sections 134 which support horizontal slide assemblies 136 which in turn carry a transfer table 138. Side rails 140 are again provided, attached to frame extensions 142. Bumper pads 144 are preferably positioned on frame extensions 142 to cushion the impact when the device is placed against a wall or other vertical surface. Device 130 may have storage surfaces/space such as a shelf 146 under the patient support area for an oxygen cylinder 148, supplies, linens, etc. Shelf 146 preferably has a wall or lip 150 along its edge to prevent items or fluids from spilling onto the floor. In this embodiment, the overall machine height is 46", its working height range is 23"-36", its width is 33.5" (to fit through a standard 36" door opening), and the overall length of the machine is 93" (for use with 80" long beds), to accommodate a patient up to 6'3" tall. The machine supports a patient weight of up to 500 lbs. Larger versions of the same design can support up to 800 lbs. The machine itself weighs about 450 lbs. A patient weight measuring system or scales can optionally be integrated into the base using strain gauges or load cells at the base of screw actuators in the vertical support sections.

Figure 11:
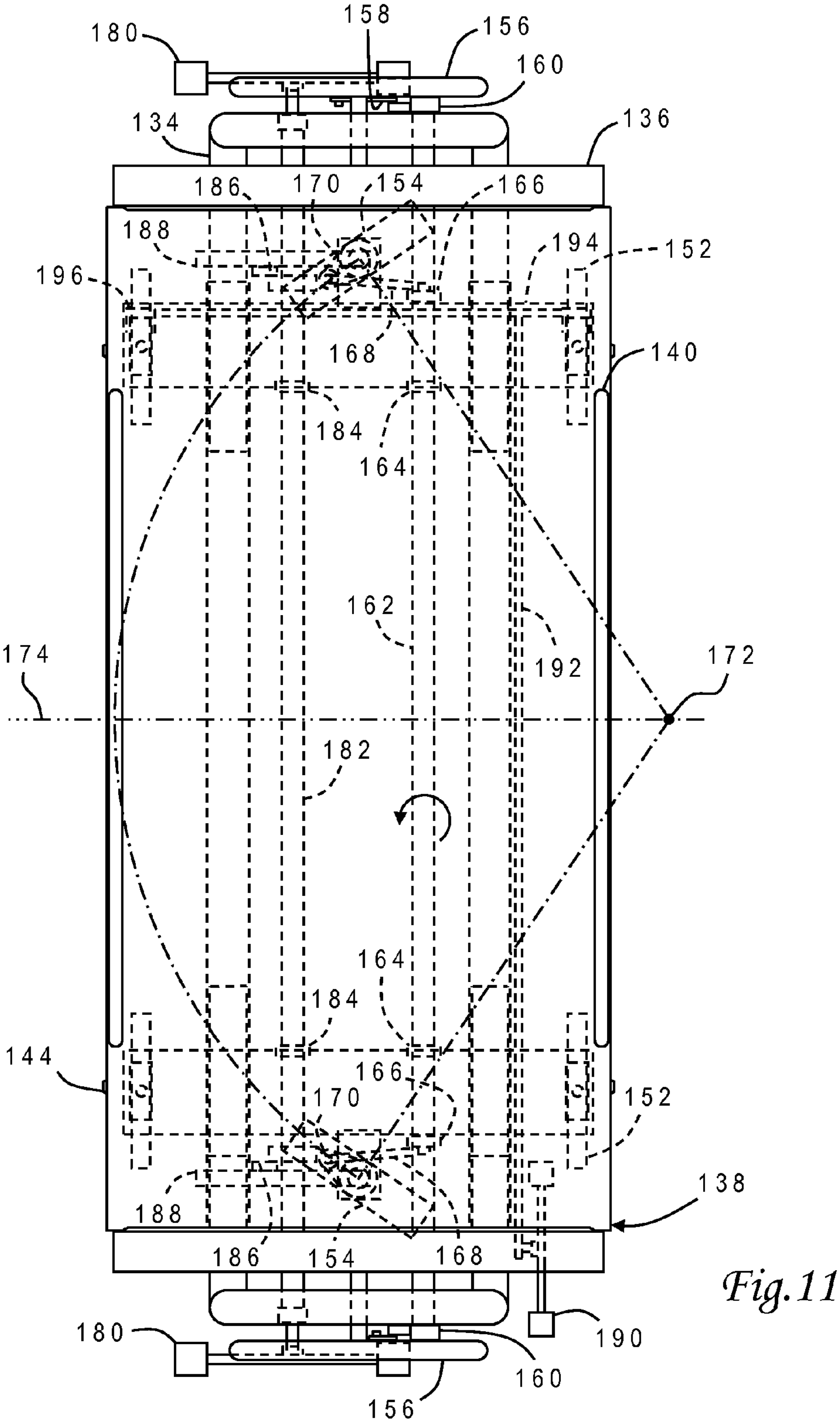
FIG. 11 is a top plan view of the wheel suspension assembly and steering linkages for the patient lift and transfer device of FIG. 10.

The wheel suspensions and steering mechanisms for patient lift and transfer device 130 are illustrated with dashed lines in the top plan view of FIG. 11. The steering mechanisms for patient lift and transfer device 130 are designed to more easily enable a single operator to maneuver the device down hallways, around corners, into elevators and rooms. Device 130 is provided with four swivel casters 152 located at or near the four corners of the generally rectangular base 132, and further employs two high-friction steering and braking wheels 154 that extend through circular cutouts in the bottom of each end of base 132. Steering and braking wheels 154 lie along a longitudinal centerline of base 132 and are supported in inverted U-shaped frames with the ends of each wheel axle connected to the open ends (legs) of the U-shape. The closed end of each U-shaped frame is attached to a hollow vertical pivot shaft. The vertical pivot shafts are bearing-supported in blocks that are mounted to the ends of base 132, and allow wheels 154 to be moved vertically approximately 1" into and out of contact with the floor. A spring applies a vertical preload of around 75 lbs to wheels 154 when they are in contact with the floor to ensure that they do not slip on the floor surface. Wheels 154 are preloaded against the floor and can move up and down 0.5" under this preload to compensate for irregularities in the floor surface. The suspension system may also include one or more shock absorbers.

Wheels 154 rotate about their vertical pivot shafts, controlled through arms and connecting links from handlebars 156 located at each end of base 132. Handlebars 156 are rotatably mounted in horizontal pivot shafts and are preferably inclined slightly at the bottom toward the operator. Each handlebar 156 is connected to one end of a push rod 158 using a spherical bearing. Spherical bearings at the other ends of push rods 158 connect to the actuation levers of respective bell cranks 160 which are affixed to a steering shaft 162 that generally extends the full length of device 130. Steering shaft is rotatably mounted in bearing blocks 164 that are attached to base 132. Another set of bell cranks 166 are affixed to steering shaft 162 proximate each wheel 154. The actuation levers of bell cranks 166 are connected to a spherical bearing in one end of respective push rods 168, and spherical bearings at the other ends of push rods 168 are respectively connected to actuation levers on a third set of bell cranks 170. Bell cranks 170 are affixed to the respective U-shaped frames that support wheels 154. Accordingly, when either handlebar 156 is rotated, its push rod will engage a bell crank 160 to rotate shaft 162 which causes bell cranks 166 to actuate push rods 168 and turn bell cranks 170 which also rotates wheels 154.

When wheels 154 are in forcible contact with the floor with the axles both perpendicular to the length of device 130, it will move ahead in a straight line when pushed at either end. Bell cranks 166 are coupled to bell cranks 170 by push rods 168 in such a manner as to rotate the axles of wheels 154 in opposite directions. For example, as viewed from the top, if the wheel at one end of the chassis base is rotated clockwise (the top wheel 154 in FIG. 11), then the wheel on the opposite end of the machine (the bottom wheel 154 in FIG. 11) rotates counterclockwise. Thus, when a handlebar 156 at either end of the machine is turned about its horizontal pivot shaft, wheels 154 will counter-rotate about their vertical pivot shafts through an equal angle (clockwise for one wheel and counterclockwise for the other wheel). Once wheels 154 are rotated in this manner device 130 can be pushed at either end to turn right or left. As a handlebar 156 is rotated more about its horizontal pivot shaft, device 130 will be able to turn more sharply to the right or left.

This steering mechanism imparts superior maneuverability over a gurney having only four swivel casters at the corners which generally requires operators at each end to carefully control the gurney movement. The steering mechanism of device 130 may be further enhanced by positioning wheels 154 such that they provide a turning path whose center of curvature 172 lies along the transverse centerline 174 of device 130. Wheels 154 are preferably located outside of casters 152, that is, wheels 154 are closer to the ends of device 130 to increase the angle of counter-rotation of the wheels to achieve a smaller turn radius. This feature decreases the side forces on wheels 154 during turning. Wheels 154 are also preferably wider (e.g., 2½") than casters 152 (e.g., 1¼"), and casters 152 are preferably constructed of a harder material such as polyurethane with around shore 80 hardness while wheels 154 are preferably constructed of a softer material such as polyurethane with around shore 60 hardness to increase traction.

A power drive (not shown) may optionally be provided for center wheels 154, including speed control. The motor(s), linkages and power supply (rechargeable battery) may be stored within the lower interior portion of base 132, with controls mounted near handlebars 156.

In addition to wheels 154 being connected to handlebar steering levers and linkages, they are also coupled to 3-position, foot-operated pedals 180 located at both ends of device 130. Foot pedals 180 are affixed to a lifting/braking shaft 182 that is again rotatably support in bearing blocks 184 attached to base 132. Another set of bell cranks 186 are affixed to lifting/braking shaft 182 proximate each wheel 154. The actuation lever of each bell crank 182 is connected to a spherical bearing at one end of a respective push rod whose other end has a spherical bearing connected to a post formed on the midsection of a lever 188. One end of each lever 188 is pivotally attached to a side of base 132, and the other end of lever 188 is slidably connected to a hollow shaft that is concentric with and inside of the respective vertical pivot shaft of a wheel 154. This end of a lever 188 also abuts a pressure plate affixed to the top end of the vertical pivot shaft that limits the upward movement of the preload spring for raising a wheel 154 off the floor. Thus, as a foot pedal 180 rotates, shaft 182 rotates and the actuation levers of bell cranks 186 cause their respective push rods to raise or lower lever 188.

Each foot pedal 180 or lifting/braking shaft 182 is provided with detents or other latch mechanisms to retain the foot pedals in one of three different positions corresponding to three positions of lever 188, namely, a raised position, a middle position, and a lowered position. When lever 188 is in the raised position, it allows the pressure plate to move upward so the force of the preload spring raises the wheel 154 off the floor. In this position only the swivel casters 152 are in contact with the floor and device 130 can be easily pushed in any direction; this steering mode is particularly useful for maneuvering the device in cramped spaces such as a hospital room. When lever 188 is in the middle position, it impacts the pressure plate and pushes the vertical pivot shaft and the wheel 154 downward against the floor with the predetermined preload force. In this position all six wheels of device 130 (wheels 154 and casters 152) are in contact with the floor and the device can be steered using handlebars 156 at either end of the machine. When lever 188 is in the lowered position, it pushes the vertical pivot shaft further downward until a braking plate affixed to the bottom of the shaft comes into contact with the top side of the wheel 154 which prevents the wheel from rotating. In this position all six wheels are again in contact with the floor but the device cannot be moved, which is particularly useful when the device is acquiring or delivering a patient. It is not necessary to provide further braking of casters 152.

The braking system may optionally provide proportional braking controlled from push handles for use when device 130 is moving. Also, the downward (preload) force on wheels 154 toward the floor may be variable, i.e., to provide a reduced force with lighter patients and an increased force with heavier patients to increase the gripping action of the wheels to the floor.

Patient lift and transfer device 130 further provides another steering mode in which two of the swivel casters 152 at a front end of the device (opposite the operator) are locked in a forward or straight direction. This steering mode may be selected using another foot pedal 190 that is advantageously located at the operator's (back) end of device. Foot pedal 190 drives a chain or belt 192 which engages a rotating shaft 194 at the front end of device 130. Shaft 194 may have threading or gears formed at each end which engage screw jacks to raise and lower guides 196. Guides 196 lock the front pair of casters 152 in a straight direction. When this feature is implemented and wheels 154 are raised, device 130 may be steered in a manner similar to a grocery shopping cart where the casters at the leading end are locked but the casters at the pushing end are free to swivel. This foot pedal, guides and linkages may be duplicated to provide the feature at both ends of the device. In an alternative embodiment (not shown), selection of this feature is accomplished using the same foot pedal 180 which provides the other steering modes, by having a fourth pedal position and using appropriate linkages as will become apparent to one skilled in the art.

A further alternative steering mode utilizes a front one of the wheels 154 in a downward position and locked (straight) direction while the back one of the wheels 154 is raised off the floor. In this manner the wheel 154 at the front end of the device can provide the front end guidance while allowing all of the casters to swivel.

The present invention thus makes three different transportation modes available to the operator: an omni-directional caster mode for easy maneuverability in cramped spaces; a steering mode using handlebars to turn the device left or right; and a push mode which allows the back casters (nearest the operator) to freely swivel while locking the front casters.

Figure 12:
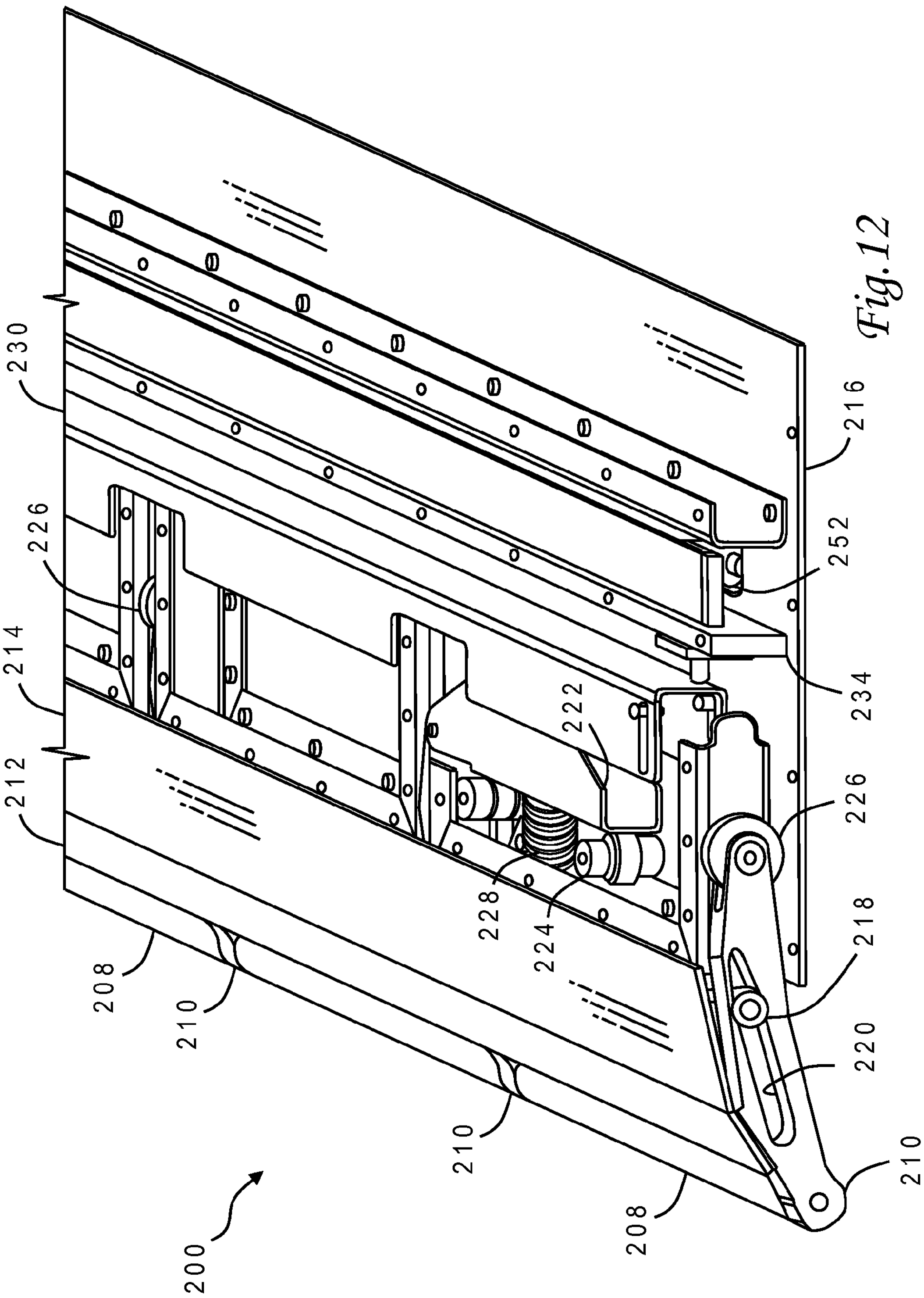
FIG. 12 is a perspective view of one side of the upper plate of the patient lift and transfer device of FIG. 10 with the upper belt removed depicting the linear extension and retraction of the edge of the upper plate to introduce slack in the upper belt.
Figure 13:
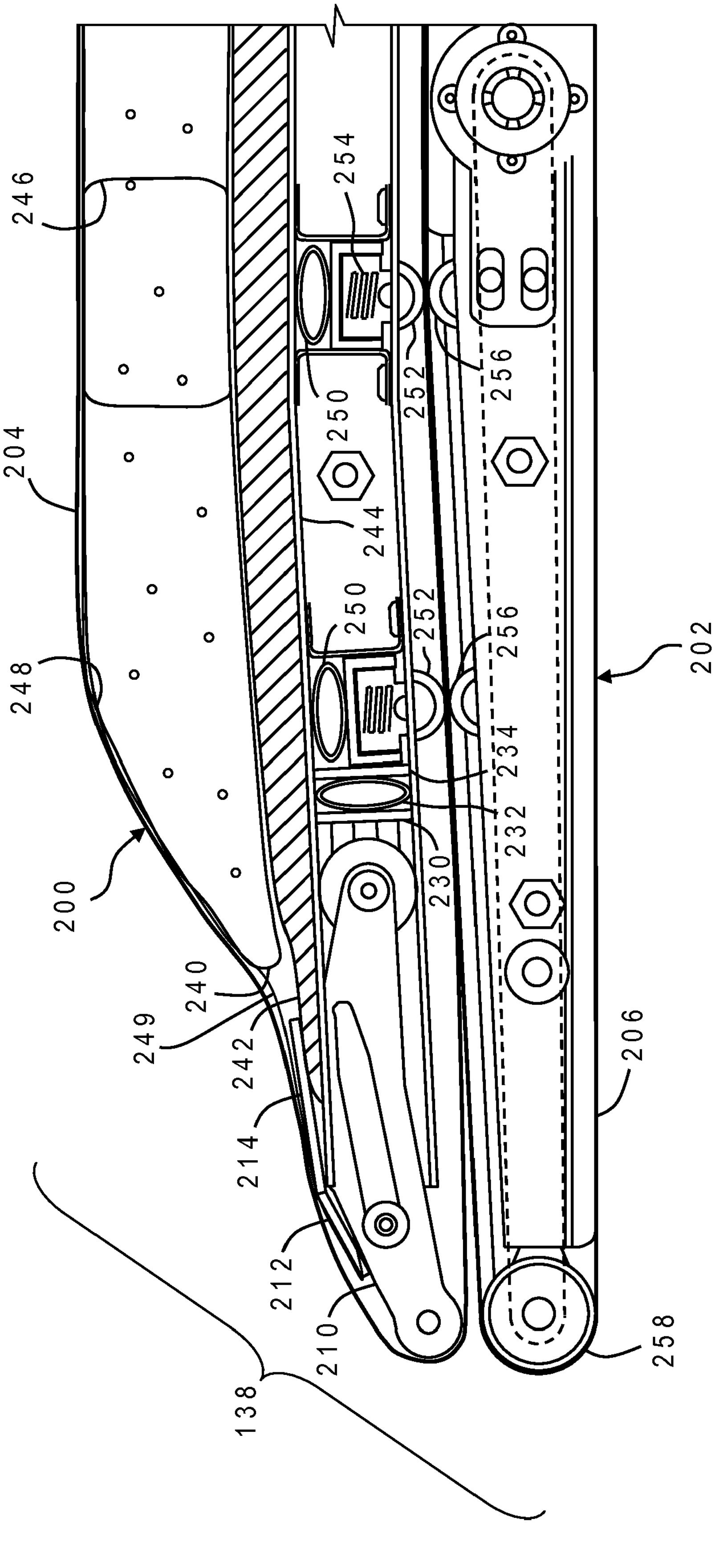
FIG. 13 is a front elevational view of one side of the upper and lower support plates of the patient lift and transfer device of FIG. 10 showing air bladders which are used to actuate pinch rollers for forcible contact between the upper and lower belts.

With reference now to FIGS. 12 and 13, transfer table 138 includes several features not found in table assembly 18 which impart additional versatility to patient lift and transfer device 130. As with table assembly 18, transfer table 138 includes an upper table 200 and a lower table 202. Upper table 200 is again surrounded by an upper belt 204, and lower table 202 is surrounded by a lower belt 206. Transfer table 138 operates in the same general manner to acquire and deliver a patient, by crawling between the patient and a support surface with upper belt 204 and lower belt 206 in counter-rotation to effectively eliminate frictional engagement as the patient is acquired, and reversing this action as the patient is delivered. However, in the embodiment of device 130 one or both sets of edge rollers of upper table 200 can extend and retract to introduce slack in upper belt 204 which, as explained further below, is used to provide a more comfortable support surface if the patient must stay on device 130 for an extended period.

The extension/retraction mechanism for one side of upper table 200 is illustrated in FIG. 12 with the belt and a topmost support plate removed to allow viewing of the internal components. Upper table 200 has several edge rollers 208 along one side which are rotatably supported by retraction arms 210. Retraction arms 210 also carry one or more plates 212, 214 which support the edge portions of upper belt 204. The retraction arms 210 at each end of upper table 200 are coupled to the central portion 216 of upper table 200 by cam followers 218 which fit within slots 220 formed in those arms. Cam followers 218 are located at the ends of struts that are affixed to one of the plate structures in central portion 216. The translational movement of edge rollers 208 is therefore governed by the shape and length of slots 220. Other refraction arms 210 are driven by several push blocks 222 having a generally triangular shape when viewed from above, which act as levers. One corner of a given push block 222 is attached to a rotating sleeve that surrounds a post 224 affixed to one of the plate structures in central portion 216. The opposite corner of push block 222 is attached to one end of a retraction arm 210. It is not necessary to provide push blocks for each arm, and there are three push blocks 222 along one side of upper plate 200 in the exemplary embodiment. Retraction arms that are not connected to a push block preferably have a belt roller 226 at one end.

Push blocks 222 are preferably biased toward central portion 216 for example using one or more compression springs 228 which are affixed at one end to a plate structure in central portion 216 with the other end impacting a side of the push block. Thus, in the unactuated position of push blocks 222, springs 228 force the free ends of the push blocks toward the center of upper table 200, placing edge rollers 208 in a retracted state. The third corner or tip of a push block 222 carries a roller which impacts a pressure plate 230 that is slidably attached to central portion 216. Pressure plate 230 has slots at its ends which receive pegs formed on a plate structure of central portion 216 to enable the sliding motion. Pressure plate 230 may be actuated by any convenient means to counter the force of springs 228 and move the free ends of push blocks 222 toward the edge of the device. The purpose of push blocks 222 is to magnify the motion of the actuator. The actuation means may comprise a pneumatic system which utilizes an inflatable tube 232 (see FIG. 13) adjacent pressure plate 230 and confined by another fixed plate 234 attached to central portion 216. Tubes 232 have feed lines connected to an air compressor on board device 130 powered by a rechargeable battery. As tube 232 inflates, it impacts the back side of pressure plate 230 which then pushes against the roller at the tip of push block 222, causing the free end of push block 222 to drive its retraction arm 210 outward, making upper belt 204 taut. Edge rollers 208 accordingly move in and out (translate) with respect to the lengthwise centerline of device 130 along the path defined by slots 220.

FIG. 12 depicts edge rollers 208 in the extended (actuated) state, while FIG. 13 shows them in the retracted (unactuated) state. The refracted state creates slack in upper belt 204 for partial disengagement from lower belt 206, but more importantly is used to enable an air lift patient support system for extended stays (when the patient must stay on the device for long periods of time). The support system includes an inflatable air mattress 240 located under the upper side of upper belt 204. Air mattress 240 may be inflated using the same air compressor that fills tubes 232. A slip sheet 249 is preferably inserted between air mattress 240 and upper belt 204. Air mattress 240 rests on a foam pad 242 which provides cushioning when air mattress 240 is not deployed. Foam pad 242 in turn rests on a top support plate 244 of upper table 200.

Air mattress 240 preferably contains shaped chambers 246 to provide different levels of support under higher pressure areas of the patient, and also contains lengthwise chambers 248 along each edge to provide a curb that prevents the patient from rolling off the edge of transfer table 138. Air mattress 240 can be inflated with heated or cooled air to help maintain comfort or a particular body temperature. A separate inflatable wedge or pillow may additionally be used to support the patient's head and shoulders.

Upper table 200 may be pivotally attached along a single lengthwise edge to horizontal slide assemblies 136 to allow it to be rotated 90° upward for cleaning operations. A latch or other temporary fastener is used to retain upper table 200 in its operative, downward position. Gas springs are used to counter balance the upper belt assembly and make it easier to rotate from its closed position to its open position.

In the design of patient lift and transfer device 10, the upper and lower tables are vertically separated to decouple the upper belt from being driven by the lower belt. However, in the design of patient lift and transfer device 130, the drive between the belts is primarily connected and disconnected by actuating and deactuating opposing pinch roller sets located in the upper and lower table frames. As this occurs, the lower side of the upper belt and the upper side of the lower belt which pass between these pinch rollers are brought into high frictional engagement with one another. When the belts are pinched together by the pinch roller sets, any motion in the lower driven belt 206 is imparted to upper belt 204. FIG. 13 illustrates air bladders 250 which are used to pneumatically actuate a set of movable nip or pinch rollers 252 for forcible contact between upper and lower belts 204, 206 in a down or extended position. Pinch rollers 252 are mounted in the frame of upper table 200, and in their unactuated state are held by springs 254 in an up or retracted position. A set of opposing fixed pinch rollers 256 are mounted in the frame of lower table 202. The lower side of upper belt 204 and the upper side of lower belt 206 pass between these sets of pinch rollers 252, 256. Air bladders 250 may be inflated using the same air compressor that fills tubes 232 and air mattress 240. Other actuation means may be provided but it is preferable to utilize a mechanism having a relatively low thickness to avoid having to overcome a steeper angle of incidence when picking up the patient.

Lower belt 206 may be driven by an elastomer-covered drive roller 258 running along one of the lengthwise edges of the lower table frame. Lower belt 206 also passes over an idler roller that runs along the opposite lengthwise edge of the lower table frame. Upper belt 204 is further supported by two idler rollers that are bearing mounted along the lengthwise edges of the upper table frame. Upper pinch roller set 252 preferably has a 0.40" vertical clearance from lower pinch roller set 256 when the pinch rollers are disengaged. When upper pinch rollers 252 are retracted, lower belt 206 can be driven but upper belt 204 will slide loosely against lower belt 206 without being driven. The belts may thus be disengaged without relative movement of the upper and lower tables. The lower belt drive is advantageously located inside of lower belt 206 to reduce or minimize mechanisms at the ends of transfer table 138 that would otherwise increase the length of the table, which effectively shortens the length available for the patient. The table elevating means may also be located at the ends of based 132 instead of under the base to increase the available vertical travel of the transfer table.

Thus, when a patient is being acquired from a bed or other surface, the lower and upper belts are coupled together by engagement of the opposing pinch rollers and both belts are driven as the transfer table moves under the patient. Before returning the transfer table to its centered position the upper belt is decoupled by disengaging the opposing pinch rollers so only the lower belt is driven. The upper table edge rollers are also retracted as previously described to provide slack for the upper belt and to further reduce tension contact forces with the lower belt. This procedure is reversed for patient delivery.

Figure 14:
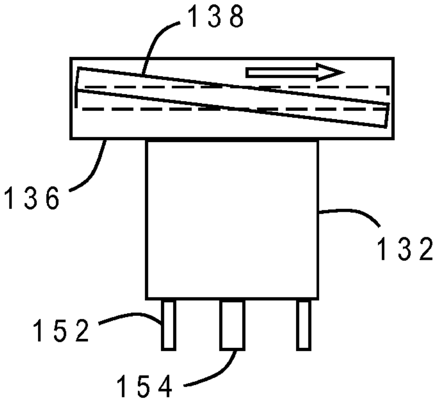
FIG. 14 is a schematic diagram illustrating transverse inclination of the table assembly of the patient lift and transfer device of FIG. 10.
Figure 15:
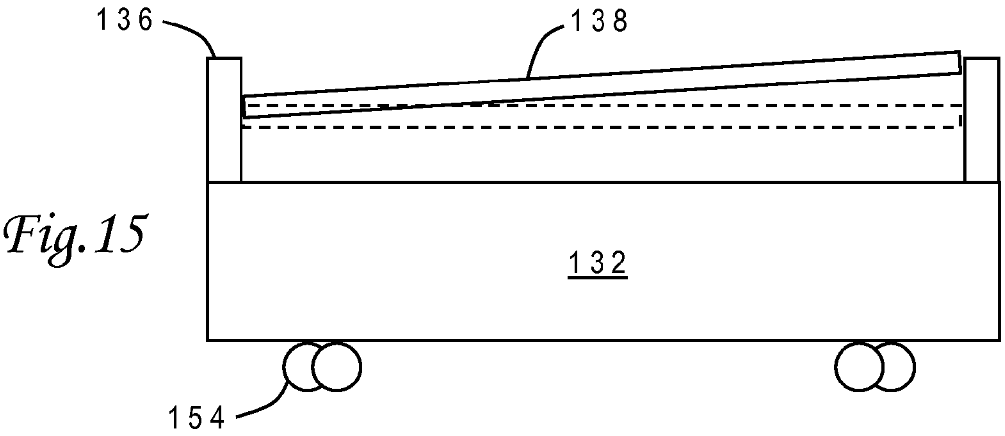
FIG. 15 is a schematic diagram illustrating longitudinal inclination of the table assembly of the patient lift and transfer device of FIG. 10.

Transfer table 138 may advantageously be oriented with different inclinations to facilitate patient acquisition/delivery and provide further comfort to the patient. FIG. 14 schematically illustrates transverse inclination of transfer table 138 as the table is moving to the side for patient acquisition. The table is inclined with a bottom leading edge as the table is inserted under the patient. This orientation may also be used when retracting transfer table 138 after patient delivery. FIG. 15 schematically illustrates longitudinal inclination of the transfer table to support the patient during transfer. In the illustrative embodiment transfer table 138 may be inclined transversely or longitudinally by an angle of ±10° from the horizontal. Transfer table 138 is inclined using screw jacks along one edge or at one end as part of the mounting mechanism. Other means may be employed to incline the transfer table, such as cams, gears, drive belts or chains, electronic servos, etc.

Inclination of transfer table 138 and other motion functions of device 130 can be electronically controlled via a user interface panel 260 having buttons or dials connected to appropriate control logic circuitry which in turn governs the electronic motors/servos. These functions may include adjusting the height of the transfer table, patient acquisition and delivery, movement of the transfer table to a home (central) position, lateral positioning of the transfer table, forward and reverse drive, a cleaning mode with the upper table rotated upward to a vertical position, or unlocking movement mechanisms to allow manual operation. Other (non-motion) functions may also be provided such as a button to toggle the electronics of the machine between a sleep (standby) mode and a wake mode for power conservation. User interface panel 260 may also have visual indicators such as light-emitting diodes (LEDs) or bar displays to provide the status of the machine or its components, including a power-on indicator, a recharging indicator, a standby indicator, side rail impact indicators responsive to side rail sensors, a latch indicator, a steering mode indicator, a caster mode indicator, a brake mode indicator, a vertical table movement indicator, a patient on-board indicator, a battery strength indicator, an error indicator and an alphanumeric readout to provide other status or help information to the operator. The electronic control logic may implement safety or other operational procedures such as making sure that the device has been cleaned before reuse (based on placement of the device in the cleaning mode to reset the machine), or making sure that the latch is properly securing the upper table before proceeding with patient acquisition.

Figure 16:
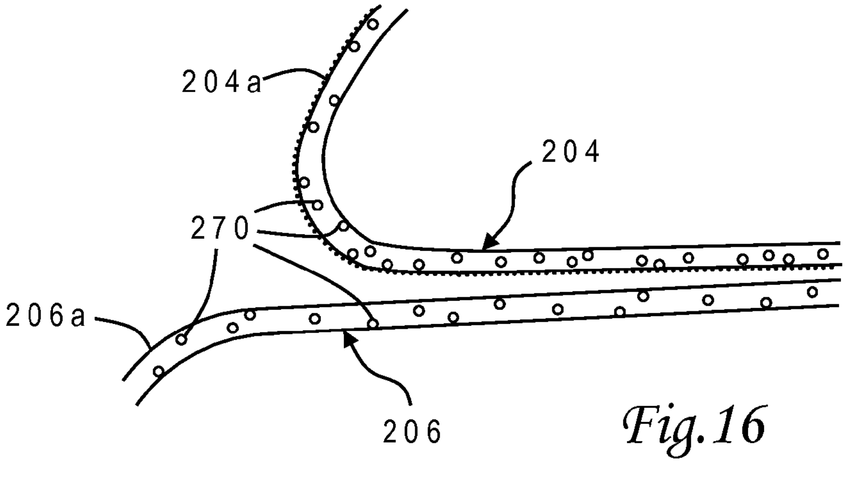
FIG. 16 is a detail view of a portion of the upper and lower belts illustrating a higher frictional surface for the upper belt, a lower frictional surface for the lower belt, and antimicrobial agents contained in the belts.

Upper and lower conveyor belts 204, 206 may be imbued with additional features to further augment the hygienic and safe operation of patient lift and transfer device 130. As seen in FIG. 16, the outer surface 204*a* of upper belt 204 has a relatively rough texture (higher friction material) and the outer surface 206*a* of lower belt 206 has a relatively smooth texture (lower friction material). Both belts may be made of polyurethane with an underlying polyester fabric and adhesive-type additives to achieve the desired frictional coefficient. For example, the coefficient of friction for upper belt 204 against a clean steel plate is about 0.4 while the coefficient of friction for lower belt 206 against a clean steel plate is about 0.1. Providing different coefficients of friction for the outer surfaces of the upper and lower belts enhances performance of the device by reducing the likelihood that loose straps, tubes, clothing, etc., may be trapped under the lower belt during patient acquisition, and yet retaining high frictional engagement with the patient to prevent slippage. The lower belt can have a slick exterior without regard to engagement with the patient support surface (e.g., bed), since the transfer table is driven across the bed mattress by horizontal slide assemblies 136, so high traction forces between the lower belt and mattress are unnecessary.

Belts 204, 206 also both preferably contain an antimicrobial agent 270 formed in the belt material. Antimicrobial agent 270 may for example by blended with a polymer material to form the belts. The antimicrobial agent is preferably a bacteriacide such as zinc or selenium to prevent or reduce the growth and transmission of microorganisms such as bacteria. A suitable belt may be adapted from the HabaGUARD antibacterial belt sold by Habasit AG of Reinach, Switzerland.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A transfer device comprising:

an elongate base having four corners;

a table supported by said base; and at least six wheels attached to a bottom of said base, said wheels including at least four swivel casters respectively located proximate the four corners of said base, and only two steering wheels located along a longitudinal centerline of said base with one of said steering wheels at each end of said base, wherein said steering wheels each have a vertical pivot shaft and said steering wheels are coupled such that their vertical pivot shafts rotate in opposite directions.

2. The transfer device of claim 1 wherein said steering wheels provide a turning path whose center of curvature lies along a transverse centerline of said base.

3. The transfer device of claim 1 wherein said steering wheels are located to the outside of said swivel casters.

4. The transfer device of claim 1 wherein said steering wheels are coupled to and controlled by handlebars mounted at each end of said base.

* * * * *